United States Patent [19]

Gustafsson et al.

[11] Patent Number: 5,539,075
[45] Date of Patent: Jul. 23, 1996

[54] UNSATURATED ETHYLENE-NON CONJUGATED DIENE COPOLYMERS AND PREPARATION THEREOF BY RADICAL POLYMERIZATION

[75] Inventors: Bill Gustafsson; Torbjörn Magnusson, both of Stenungsund, Sweden; Kari Alha, Kerava, Finland; Peter Rydin, Ödsmål, Sweden

[73] Assignee: Borealis Holding A/S, Denmark

[21] Appl. No.: 211,972

[22] PCT Filed: Jul. 1, 1992

[86] PCT No.: PCT/SE92/00491

§ 371 Date: Apr. 21, 1994

§ 102(e) Date: Apr. 21, 1994

[87] PCT Pub. No.: WO93/08222

PCT Pub. Date: Apr. 29, 1993

[30] Foreign Application Priority Data

Oct. 22, 1991 [SE] Sweden .................................. 9103077

[51] Int. Cl.[6] .......................... C08F 236/20; C08F 12/34
[52] U.S. Cl. .......................... 526/339; 526/279; 526/319; 526/332; 526/336; 526/340.3
[58] Field of Search ................................... 526/336, 339, 526/340.3

[56] References Cited

U.S. PATENT DOCUMENTS

| | | | |
|---|---|---|---|
| 2,933,480 | 4/1960 | Gresham ................................... | 526/336 |
| 3,357,961 | 12/1967 | Makowski et al. . | |
| 5,190,862 | 6/1965 | Boghetich ................................... | 526/336 |
| 5,298,582 | 3/1994 | Brusson ................................... | 576/262 |

FOREIGN PATENT DOCUMENTS

| | | |
|---|---|---|
| 0008528 | 3/1980 | European Pat. Off. . |
| 0260999 | 3/1988 | European Pat. Off. . |
| 2660660 | 11/1991 | France . |
| WO91/07761 | 5/1991 | WIPO . |
| WO91/17194 | 11/1991 | WIPO . |

OTHER PUBLICATIONS

Chemical Abstract, vol. 116, No. 4, 27 Jan. 1992, p. 15, 21674b.
Chemical Abstract, vol. 69, No. 24, 9 Dec. 1968, 97310m.
International Search report–PCT/SE92/00491.
International–Type Search Report–SE91/00475.
Chemical Abstract, vol. 101, No. 12, 17 Sep. 1984, 92065e.
Encyclopedia of Polymer Science and Engineering, vol. 6, Emulsion Polymerization to Fibers, Manufacture, 1986, by John Wiley Sons, Inc.
Extract from H. Bennet, *Concise Chemical and Technical Dictionary*, Third Ed., Chemical Publishing Col, Inc., New York, NY (1974).
Kaltenbacher et al., "Polyethylene for Extrusion Coating", *Plastics*, 34:168–171 (Feb. 1969).

Primary Examiner—Fred Zitomer
Attorney, Agent, or Firm—Merchant, Gould, Smith, Edell, Welter & Schmidt

[57] ABSTRACT

The invention concerns an unsaturated ethylene copolymer, a method for producing the ethylene copolymer, and the use of the ethylene copolymer in compositions for producing cross-linked structures, such as material for electric cables. In the method, ethylene and at least one monomer which is copolymerizable with ethylene and includes a polyunsaturated comonomer having a chain of at least 8 carbon atoms and at least 2 non-conjugated double bonds, of which at least one is terminal, are polymerized at a pressure of about 100–300 MPa and a temperature of about 80°–300° C. under the action of a radical initiator. The polyunsaturated comonomer preferably is an α,ω-alkadiene having 8–16 carbon atoms, most preferred 1,9-decadiene. Apart from the polyunsaturated comonomer, polymerization may also involve another vinyl-unsaturated monomer, preferably containing at least one functional group selected from hydroxyl groups, alkoxy groups, carbonyl groups, carboxyl groups and ester groups. The ethylene copolymers produced have an increased degree of unsaturation, which can be used for cross-linking the ethylene copolymer or grafting reactive groups.

18 Claims, 1 Drawing Sheet

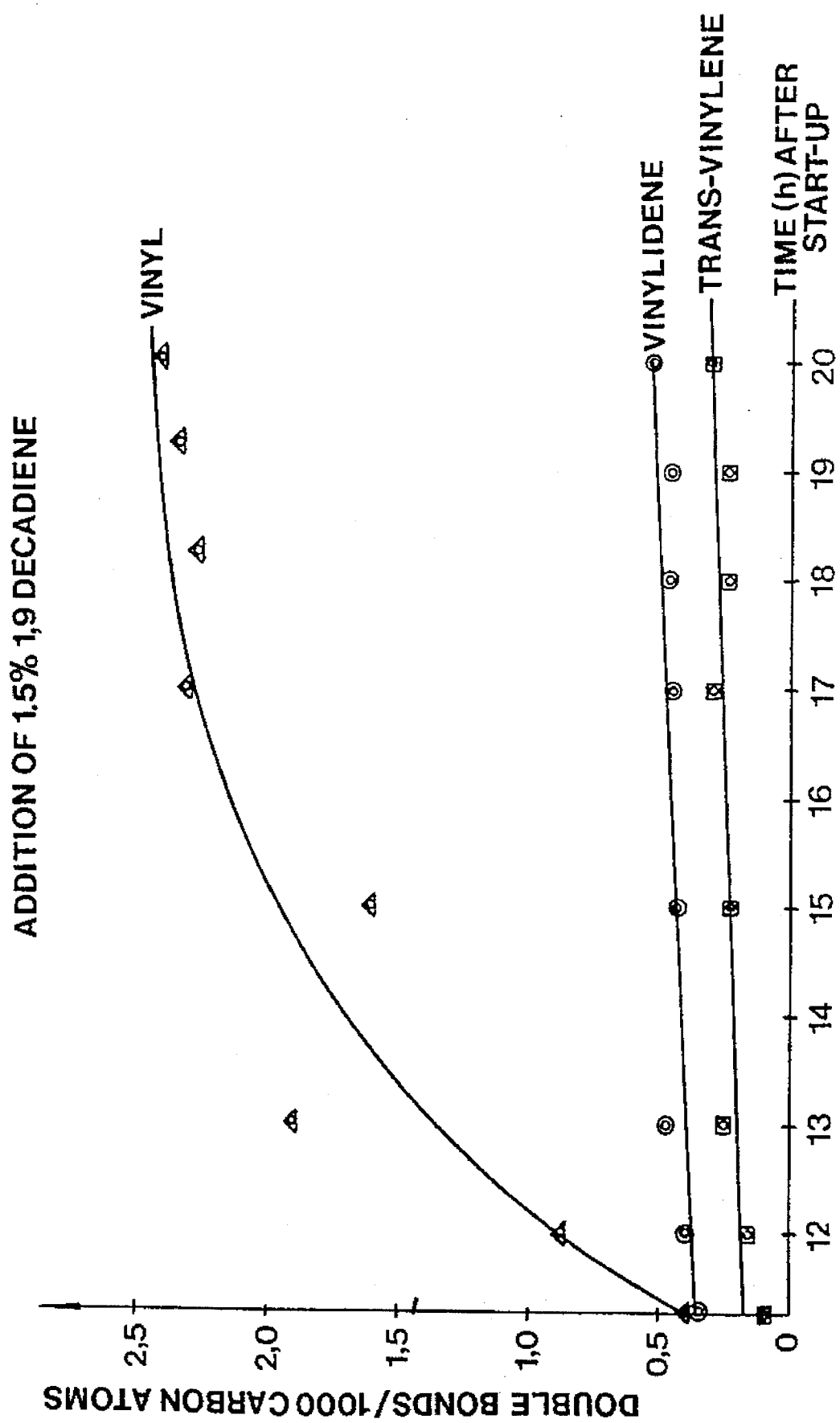

UNSATURATED ETHYLENE-NON CONJUGATED DIENE COPOLYMERS AND PREPARATION THEREOF BY RADICAL POLYMERIZATION

The present invention relates to an unsaturated ethylene copolymer and a method for the production thereof. More specifically, the invention concerns an unsaturated ethylene copolymer having an increased degree of unsaturation and being produced by radical polymerisation through a high-pressure process.

Normally, polyethylene produced by radical polymerisation, so-called LDPE, has a low degree of unsaturation in the order of 0.1 double bonds/1000 carbon atoms. In many situations, it is desirable to use polymers having a higher degree of unsaturation, which may serve as seat for chemical reactions, such as the introduction of functional groups into the polymer molecule or the cross-linking of the polymer. It is known that an increased level of double bonds can be obtained in polyethylene produced by organometallic catalysis, i.e. involving a coordination catalyst, by introducing as comonomers compounds having several double bonds, in which case only one bond is used for polymerising the comonomer into the polymer chain. EP 0 008 528 and JP 0 226 1809, for instance, disclose such prior-art techniques. Further, EP 0 260 999 relates to copolymers of ethylene and dienes having 4–18 carbon atoms, such as 1,4-hexadiene, in which case polymerisation is performed by means of a so-called metallocene catalyst at a high pressure. Mention may also be made of WO 91/17194 which concerns copolymers of α-olefins, such as ethylene, and α,ω-dienes having 7–30 carbon atoms, preferably 8–12 carbon atoms, such as 1,9-decadiene, in which case polymerisation is coordination-catalysed. Moreover, U.S. Pat. No. 3,357,961 discloses the production of a copolymer of ethylene and 1,5-hexadiene by coordination-catalysed low-pressure polymerisation. One may further mention Chemical Abstracts, Vol. 116, No. 4, 27th Jan. 1992, p. 15, Abstract 21674b (JP 0 322 1508, published on 30th Sep. 1991); Chemical Abstracts Vol. 101, No. 12, 17th September 1984, p. 42, Abstract 92065e (JP 595 6412 published on 31st Mar. 1984); and Chemical Abstracts, Vol. 69, No. 74, 9th Dec. 1968, Kiti, Itsuo: "Ethylene-1,4-hexadiene copolymers" p. 9135, Abstract 97310m. These abstracts relate to copolymers of ethylene and non-conjugated dienes, such as 1,4-hexadiene, 1,7-octadiene and 1,9-decadiene, and involve the use of coordination-catalysed polymerisation.

As already mentioned, the above references relate to coordination-catalysed polymerisation. Coordination-catalysed polymerisation and radical-initiated polymerisation are two fundamentally different types of polymerisation, resulting in different types of polymers. While coordination-catalysed polymerisation essentially yields unbranched linear polymer molecules, radical-initiated polymerisation yields heavily branched polymer molecules with long side chains. Consequently, polymers produced by the two processes have different properties. For instance, polymers produced by coordination-catalysed polymerisation have a higher density than those produced by radical-initiated polymerisation. They also have a higher melt viscosity at the same melt index, which means that the polymers produced by a radical-initiated high-pressure process are, in general, easier to process.

It should be emphasised that the fact that coordination-catalysed polymerisation and radical-initiated polymerisation are two fundamentally different processes means that no conclusions about one process can be drawn from the other. If, in coordination-catalysed polymerisation involving the addition of diene, only one double bond of the diene reacts, one may thus not conclude that this is also the case in radical-initiated polymerisation. Whether the diene reacts or not in coordination-catalysed polymerisation depends on the action produced by the coordination catalyst employed. Since radical-initiated polymerisation does not involve any such catalyst, there is no reason to assume that the diene will react in the same way in radical-initiated polymerisation.

On the contrary, in FR 2,660,660, for instance, non-conjugated dienes are used as chain-transfer agents in radical-initiated polymerisation of ethylene. According to the FR specification, the purpose is to improve the stretchability and/or the "neck-in" of polymers intended for coating, by using a non-conjugated diene as chain-transfer agent in the polymerisation, i.e. an agent for adjusting the molecular weight of the produced polymer. Thus, the diene molecular donates a hydrogen atom to the growing molecule chain, whose growth is thereby interrupted. The normally allylic radical simultaneously formed from the diene molecule may then initiate a new chain, which optionally receives a double bond from the diene molecule at its initial end. It should be observed that one diene molecule at the most is incorporated in each new chain according to this mechanism. This means that the double-bond content that can be incorporated is fairly restricted (about 0.1–0.2 double bonds/1000 carbon atoms at normal molecular weights) and that the double-bond content of the resulting polymer cannot be varied independently of the desired MFR value (melt flow rate). Thus, the problem solved in FR 2,660,660 is completely different from that on which the present invention is based. The polymers produced according to FR 2,660,660 are homopolymers of ethylene or copolymers of ethylene and at least one ester of acrylic or methacrylic acid. The only non-conjugated diene exemplified in FR 2,660,660 is 1,5-hexadiene, but it is generally held that long-chain, non-conjugated dienes having at least 6 carbon atoms, such as 1,5-hexadiene, 1,9-decadiene and 2-methyl-1,7-octadiene, may be used as chain-transfer agents.

The use of non-conjugated dienes as chain-transfer agents according to FR 2,660,660 is contrary to the prior-art technique in coordination-catalysed polymerisation described by way of introduction, and thus emphasises the difference between radical-initiated polymerisation and coordination-catalysed polymerisation.

Further, the published International Patent Application WO 91/07761 discloses a cable sheathing composition prepared by radical-initiated high-pressure polymerisation and containing ethylene, 30–60% by weight of a monofunctional ethylenically unsaturated ester, preferably vinyl acetate or methyl acrylate, and 1–15% by weight of a multifunctional ethylenically unsaturated termonomer having at least two ethylenically unsaturated groups. The polymer has a melt index of 0.1–10, and the composition further contains a filler, a cross-linking agent and a stabiliser. The multifunctional termonomer is a doubly unsaturated molecule containing —O— or C=O. Preferably, the termonomer is obtained by esterification of a glycol and acrylic acid or a homologue thereof. It is most preferred that the termonomer is ethylene glycol dimethacrylate (EDMA). Unlike aliphatic diene hydrocarbons, this acrylate-containing polyunsaturated termonomer is very reactive, and all the unsaturation of the termonomer will thus react in the polymerisation of the polymer. Consequently, polymerisation does not yield any unsaturated polymer product, and the termonomer serves to adjust, i.e. lower, the melt index of the product, which it does by cross-linking pairs of polymer chains. It is worth noticing that the polymers obtained according to the WO specification are, by containing a large amount of polar comonomers of ester type, unsuited for use as insulating cable material, since they involve high dielectric losses and probably give poor strippability compared with the materials normally used in the semiconductor layers of a power cable.

It may here be mentioned that the art embraces the knowledge that increased double-bond contents can be obtained also in polyethylene produced by radical polymerisation through a high-pressure process, by adding propylene as chain-transfer agent, which has the limitations mentioned above with regard to FR 2,660,660. (This is described in, inter alia, Encyclopedia of Polymer Science and Technology, Rev. Ed., Vol. 6 (1986), p. 394, last par.—p. 395, first par.) The level of double-bond content thus achieved in LDPE of about 0.3–0.4 double bonds/1000 carbon atoms is, however, insufficient in many contexts.

In view of the prior art discussed above, it has now surprisingly been found that some, but not all, polyunsaturated compounds having two or more non-conjugated double bonds do not act as chain-transfer agents, contrary to what is stated in FR 2,660,660, but can instead be used as comonomers in radical-initiated polymerisation of ethylene for introducing unsaturation in the polymer with excellent yield.

More precisely, it has been found that, while short non-conjugated dienes, such as 1,5-hexadiene, and branched dienes, primarily in allyl position, such as 2-methyl-1,6-octadiene, act mainly as chain-transfer agents in radical-initiated polymerisation together with ethylene, straight-chain polyunsaturated compounds having a straight carbon chain without heteroatoms and with at least two non-conjugated double bonds, of which at least one is terminal, and having at least 4 saturated carbon atoms between the double bonds, i.e. a total of 8 or more carbon atoms, preferably 8–16 carbon atoms, do not act in this way but as comonomers in which one double bond is polymerised into the monomer chain while the other double bond or bonds do not react and instead increase the unsaturation of the polymer. This fact, which is surprising in view of FR 2,660,660, results in a polymer of a different structure than that of the FR specification. If the polyunsaturated compound had acted as a chain-transfer agent, the non-reacted double bonds would have had a terminal position in the polymer molecule. This would mean that the double-bond content would decrease in proportion to the increase of the chain length. Since the polyunsaturated compound according to the invention acts as a comonomer, the non-reacted double bonds will instead be positioned at the end of short branches at the site in the polymer chain where the polyunsaturated compound was incorporated by polymerisation, such that the unsaturation is uniformly distributed along the polymer chain in random copolymerisation.

This was not to be expected in view of FR 2,660,660, and constitutes a fundamental difference which should have become apparent if FR 2,660,660 had involved tests on e.g. 1,9-decadiene.

In addition to the surprising discovery that the defined polyunsaturated compounds do not act as chain-transfer agents but as comonomers, the invention involves the surprising finding that the other double bond of the polyunsaturated comonomer remains essentially intact in the polymerisation, i.e. without resulting in a chain transfer, initiating any growing side branches or being otherwise chemically transformed. Thus, it has been found that, if the unsaturation of the straight-chain polyunsaturated comonomer consists of two or more non-conjugated double bonds, of which at least one is terminal, only one double bond in most of the comonomer molecules will react with the ethylene by copolymerisation, while the other double bond or bonds will remain intact.

The invention thus provides an unsaturated ethylene copolymer which is characterised in that it comprises a polymer obtained by radical polymerisation through a high-pressure process of ethylene and at least one monomer which is copolymerisable with ethylene and includes a polyunsaturated comonomer having a straight carbon chain which is free from heteroatoms and has at least 8 carbon atoms and at least 4 carbon atoms between two non-conjugated double bonds, of which at least one is terminal.

The invention further provides a method for producing an unsaturated ethylene copolymer, which is characterised by polymerising, at a pressure of about 100–300 MPa and a temperature of about 80°–300° C. and under the action of a radical initiator, ethylene and at least one monomer which is copolymerisable with ethylene and includes a polyunsaturated comonomer having a straight carbon chain which is free from heteroatoms and has at least 8 carbon atoms and at least 4 carbon atoms between two non-conjugated double bonds, of which at least one is terminal.

The invention also concerns the use of the unsaturated ethylene copolymer in compositions for producing cross-linked structures, such as insulating-layer material, semiconductor-layer material and sheath material for electric cables.

Other distinctive features of the invention appear from the following description and the appended claims.

To obtain an optimal result by the invention, there should be a certain distance between the non-conjugated double bonds of the polyunsaturated comonomer. Preferably, there are at least four carbon atoms without ethylenic unsaturation between the double bonds. In other words, the polyunsaturated comonomer molecule should have a certain length, and alkadiene comonomers should contain at least 8 carbon atoms, preferably 8–16 carbon atoms, most preferred 10–14 carbon atoms. Further, the diene preferably has a straight chain, since each tertiary or allylic hydrogen atom increases the risk of chain transfer.

According to the invention, the polyunsaturated comonomer may essentially consist of any straight-chain polyunsaturated compound containing at least two non-conjugated double bonds, of which at least one is terminal, and comprising a chain with at least 8 carbon atoms and without heteroatoms. Preferred monomers are $\alpha,\omega$-alkadienes having 8–16 carbon atoms. Preferably, the polyunsaturated comonomer is not substituted, i.e. it consists of an unsubstituted straight-chain hydrocarbon having at least two non-conjugated double bonds. Owing to reactivity and commercial availability, the most preferred comonomers are 1,7-octadiene, 1,9-decadiene and 1,13-tetradecadiene.

The content of the polyunsaturated comonomer is such that the unsaturated copolymer contains 0.2–3% by weight thereof, preferably 0.2–1.5% by weight, which corresponds to an unsaturation of, respectively, 0.2–3 and 0.2–1.5 double bonds/1000 carbon atoms for 1,9-decadiene.

Apart from ethylene and at least one polyunsaturated comonomer, the ethylene polymer according to the invention may contain up to 40% by weight of some other monomer which is copolymerisable with ethylene. Such monomers are well-known to the expert and need not be accounted for in greater detail here. Mention may, however, be made of vinyl-unsaturated monomers, such as $C_3$–$C_8$ $\alpha$-olefins, e.g. propylene, butylene, and so forth; and vinyl-unsaturated monomers containing functional groups, such as hydroxyl groups, alkoxy groups, carbonyl groups, carboxyl groups and ester groups. Such monomers may, for instance, consist of (meth)acrylic acid and alkyl esters thereof, such as methyl-, ethyl-, and butyl(meth)acrylate; and vinyl-unsaturated hydrolysable silane monomers, such as vinyl trimethoxy silane, and so forth.

Propylene and higher α-olefins may be regarded as a special case, since they also act as chain-transfer agents and create terminal unsaturation in the polymer (cf. the foregoing regarding the creation of increased double-bond contents by adding propylene as comonomer (Encyclopedia of Polymer Sciences and Technology, Rev. Ed., Vol. 6 (1986), pp 394–395) as well as the foregoing discussion of FR 2,660, 660 on the limitations as to possible double-bond content and MFR-value associated with the use of molecule types acting as chain-transfer agents). Using propylene (or some other higher α-olefin) as comonomer in addition to the polyunsaturated comonomer defined above thus makes it possible to further increase the degree of unsaturation of the produced copolymer in a comparatively simple and inexpensive manner.

As stated above, the unsaturated ethylene polymer according to the invention is produced by high-pressure polymerisation with free-radical initiation. This polymerisation process, which is well-known in the art and thus need not be accounted for in more detail here, is generally performed by reacting the monomers under the action of a radical initiator, such as a peroxide, a hydroperoxide, oxygen or an azo compound, in a reactor, e.g. an autoclave or a tube reactor, at a high pressure of about 100–300 MPa and an elevated temperature of about 80°–300° C. When the reaction is completed, the temperature and the pressure are lowered, and the resulting unsaturated polymer is recovered. Further details of the production of ethylene polymers by high-pressure polymerisation with free-radical initiation can be found in the Encyclopedia of Polymer Science and Engineering, Vol. 6 (1986), pp 383–410, especially pp 404–407.

As mentioned by way of introduction, the copolymers according to the invention are intended for use when a polymer with reactive sites in the form of ethylenic unsaturation is to be produced. Ethylenic unsaturation may be used for introducing functional groups, such as hydroxyl and carboxyl, in the polymer by a reaction with compounds containing such groups. The ethylenic unsaturation may also be used for cross-linking the polymer, which perhaps is its primary use. The cross-linking of polyethylene is of interest in many contexts, such as extrusion (e.g. of tubes, cable insulating material or cable sheathing), blow moulding, rotational moulding, etc.

This technique is of special interest in cable technology, for which reason this will be discussed in more depth here. In the extrusion of e.g. a power cable, the metallic conductor generally is first coated with a semiconductor layer, then with an insulating layer, then with another semiconductor layer optionally followed by water barrier layers, and finally with a sheath layer.

At least the insulating layer and the outer semiconductor layer normally consist of cross-linked ethylene homopolymers and/or ethylene copolymers. Cross-linking substantially contributes to improve the temperature resistance of the cable, which will be subjected to considerable temperature stress when in operation. Cross-linking is brought about by adding free-radical-forming agents, mostly of peroxide type, to the polymer materials in the above layers prior to extrusion. This radical-forming agent should preferably remain stable during the extrusion but decompose in a subsequent vulcanisation step at an elevated temperature, thereby forming free radicals which are to initiate cross-linking. Premature cross-linking during extrusion will show as "scorch", i.e. as inhomogeniety, surface unevenness and possible discolouration, in the different layers of the finished cable. Consequently, the polymer material and the radical-forming agent must not, in combination, be too reactive at the temperatures prevailing in the extruder (about 125°–140° C.).

After the extruder, the cable is passed through a long multi-zone vulcanising tube where cross-linking should take place as rapidly and completely as possible; initiated by the heat emitted in one or more heated zones of the tube. A nitrogen-gas pressure is also applied in the tube, and contributes to prevent oxidation processes by keeping away the oxygen of the air and to reduce the formation of microcavities, so-called voids, in the polymer layers by reducing the expansion of the gases resulting from the decomposition of the radical-forming agent. It is desirable that cross-linking is rapid but requires as little free-radical-forming agent as possible, since this reduces the risk of scorch in the extruder, results in minimum formation of microcavities as mentioned above, and is economically advantageous, peroxide being an expensive additive. Thus, the polymer material to be cross-linked should be as reactive as possible in the vulcanising step. As illustrated in Example 19 below, the present invention substantially contributes to such reactive properties.

It appears from the foregoing that the unsaturated ethylene copolymer according to the invention can be used as material for semiconductor layers, insulating layers and/or sheath layers of electric cables.

The following non-restricting embodiments and comparative Examples are meant to further elucidate the invention.

EXAMPLES 1–7

A 200-ml reactor for batch polymerisation was flushed with ethylene and then connected to a vacuum pump which generated a negative pressure in the reactor. This negative pressure was used for drawing 20 ml of a mixture of polymerisation initiator, diene and isodecane (solvent) into the reactor. Then, ethylene was pumped into the reactor at a pressure of about 130 MPa (isothermic conditions). At this point, the temperature was about 20°–25° C. Thereafter, the reactor was heated to about 160°–170° C., the pressure in the reactor rising to about 200 MPa and the polymerisation reaction began, which was indicated by a further increase in temperature to about 175° C. No ethylene was supplied to the reactor in the course of the reaction. The test continued until the reactor temperature had passed a maximum value and started to drop, which indicated that the polymerisation reaction was completed. The reactor was then cooled to room temperature, blown off and opened for removal of the polymer formed, which was present in an amount of about 5–15 g.

The degree of unsaturation of the polymer was analysed by means of IR spectrometry and indicated as the number of vinyl bonds per 1000 carbon atoms. The test results appear from Table 1 below.

TABLE 1

| Test No. | Diene Name | Mol % | Melting point (°C.) | Double bonds per 1000 carbon atoms |
|---|---|---|---|---|
| 1 | None | — | 113.8 | 0.05 |
| 2 Compa- | 1,5-hexadiene | 0.034 | 114.0 | 0.04 |

TABLE 1-continued

| Test | Diene | | Melting point | Double bonds per |
|---|---|---|---|---|
| No. | Name | Mol % | (°C.) | 1000 carbon atoms |
| 3 Comparative | " | 0.103 | 112.2 | 0.08 |
| 4 Comparative | " | 0.344 | 110.6 | 0.13 |
| 5 Invention | 1,9-decadiene | 0.061 | 111.4 | 0.12 |
| 6 Invention | " | 0.205 | 113.1 | 0.34 |
| 7 Invention | " | 2.205 | 111.3 | 1.96 |

The amount of diene indicated in mol % relates to the content of the gas mixture, not of the polymer formed.

The density of the polymers formed in the tests was about 0.926 g/cm³ and the crystallinity was about 40%. The tests show that, while the yield of double bonds is very low for 1,5-hexadiene, 1,9-decadiene gives a substantial contribution thereof. Indirectly, this also shows that 1,5-hexadiene acts as a chain-transfer agent, while 1,9-decadiene instead acts as a comonomer and thus gives a substantial contribution of double bonds to the polymer formed.

EXAMPLE 8

In this test, use was made of a continuous autoclave reactor having a recycling system. The reactor volume was about 5 l. Ethylene was supplied to the reactor through two inlet ducts; 50% of the ethylene was pumped to the reactor via the motor housing (for cooling), and the remainder was supplied directly. A double-acting hydraulic pump was used for supplying the ethylene. The total flow rate was 25–30 l/h.

An initiator was added through two injection systems to an upper and a lower injection nozzle. The diene, here 1,9-decadiene, was supplied through the upper nozzle. The addition of 1,9-decadiene was begun about 11 h 15 min after start-up. The 1,9-decadiene content was 1.5%.

At start-up, heat exchangers on the ethylene ducts were used for heating the reaction mixture. The heat exchangers were turned off as soon as the reaction had started.

The polyethylene/ethylene mixture was removed from the reactor through a product valve. Ethylene was removed in gaseous form from the mixture in a high-pressure and a low-pressure separator and was recycled to the reactor. The polyethylene was removed from the low-pressure separator and pressed through a nozzle out into a water bath, where it was recovered. Residual products were removed by opening a drain valve after the return-gas cooler. Samples were taken intermittently and analysed for the content of different double bonds. These contents appear from FIG. 1.

As appears from the Figure, the content of vinyl groups increases continuously in the course of the test towards a state of equilibrium. This is so because unreacted 1,9-decadiene is recycled, which gradually increases the concentration thereof in the gas mixture up to a level of equilibrium. The main part of the double bonds found in the copolymer are terminal vinyl groups on short side chains, but also vinylidene groups and transvinylene groups occur.

In the given Examples, the comonomers have two terminal double bonds, which means that the unsaturation of the copolymers will mainly be present in the form of terminal vinyl groups on side chains. It is to be understood that if a double bond of the comonomer is not terminal, the side chains of the copolymer will contain double bonds which are not terminal.

EXAMPLE 9

A terpolymer of ethylene, butyl acrylate and 1,9-decadiene was produced by using a tube reactor. A mixture of air and tert-butyl peroxyethyl hexanoate was used as initiator, and methyl ethyl ketone (MEK) was used as chain-transfer agent. The reactor was supplied with about 20 tons of ethylene/h, about 180 l of butyl acrylate/h, and about 48 l of 1,9-decadiene/h. The pressure in the reactor was 220 MPa, and the temperature was 180°–220° C. Unreacted 1,9-decadiene in the reactor was separated in a cooler. Polymerisation yielded about 6 tons of polymer product/h. The chain-transfer agent (MEK) was added in such an amount that the terpolymer formed had a melt flow rate (MFR) of 2 g/10 min. When analysed, the terpolymer was found to have a butyl acrylate content (BA) of about 2% by weight and a vinyl unsaturation originating from 1,9-decadiene of about 0.35 vinyl groups/1000 C.

EXAMPLE 10

Two polymerisation tests were carried out, using an agitated continuous 800-litre autoclave reactor divided into two sections.

In the first test, ethylene was polymerised by being supplied to the reactor in an amount of about 35 tons/h. The temperature in the upper reactor section was 172° C., and that in the lower reactor section was 270° C. The pressure in the reactor was 165 MPa. Tert-butyl pivalate was used as polymerisation initiator in the upper section, and tertbutyl benzoate was used in this capacity in the lower section. Propylene was added as a chain-transfer agent to give the prepared polymer a melt flow rate (MFR) of 0.35 g per 10 min. In the test, about 7 tons of polyethylene was formed per hour. The unsaturation of the polyethylene was found to be 0.30 vinyl groups/1000 C.

In the second test, the conditions were the same apart from an extra addition of 1,9-decadiene, which yielded a copolymer having an unsaturation of 0.50 vinyl groups/1000 C. The transformation of 1,9-decadiene was estimated at about 25% per reactor passage. The melt flow rate (MFR) of the polymer was adjusted to 0.35 g/10 min by adding the same amount of propylene as in the first Test.

This Example illustrates not only that propylene creates terminal unsaturation of the polymer in addition to acting as a chain-transfer agent (as mentioned above), but also that an addition of non-conjugated diene in the form of 1,9-decadiene effectively increases the degree of unsaturation of the polymer at the same time as it does not act as a chain-transfer agent.

EXAMPLE 11

A copolymer comprising 91% by weight of ethylene and 9% by weight of vinyl acetate was produced by means of the reactor employed in Example 10. The pressure in the reactor was 180 MPa. The temperature in the upper section was 150°–160° C., and that in the lower section was 195°–220° C. Tert-butyl perneodecanoate was added as polymerisation initiator in the upper section, and tert-butyl pivalate was added in the lower section. Propylene was added as chain-transfer agent to give the polymer a melt flow rate (MFR) of 0.5 g/10 min. The test yielded about 6 tons of polymer product/h, and the unsaturation of the polymer was found to be 0.1 vinyl groups/1000 C.

In a second test under otherwise identical conditions, 15–20 kg of 1,9-decadiene was added per hour and copolymerised with ethylene and vinyl acetate so as to yield a terpolymer having an unsaturation of 0.3 vinyl groups/1000 C. The degree of transformation of the 1,9-decadiene was about 25% per reactor passage.

EXAMPLE 12

A copolymer of ethylene and 1,9-decadiene was produced by means of the reactor employed in Example 9. The supply of 1,9-decadiene to the reactor was about 15–20 l/h, and methyl ethyl ketone (MEK) was added as chain-transfer agent to give the polymer a melt flow rate (MFR) of 1.9 g/10 min. A mixture of air and tert-butyl peroxyethyl hexanoate was used as polymerisation initiator. The test yielded about 6 tons/h of a polymer product having an unsaturation of 0.25 vinyl groups/1000 C.

EXAMPLE 13

Example 12 was repeated, but with an addition of 1,9-decadiene of about 140 l/h. This yielded a copolymer of ethylene and 1,9-decadiene having an unsaturation of 0.7 vinyl groups/1000 C.

EXAMPLE 14

Example 13 was repeated, but with an increase of the MEK addition to give an MFR of 4 g/10 min. The unsaturation remained unchanged, i.e. 0.7 double bonds/1000 C. This Example shows that the MRF value for the polymer can be varied in the invention, regardless of the desired degree of unsaturation.

EXAMPLE 15

In a two-stage tube reactor, ethylene was polymerised at a pressure of 230 MPa and a temperature of 239° C. in the first stage and 325° C. in the second stage. An addition of 220 l of methyl ethyl ketone (MEK) per hour gave the ethylene polymer a melt flow rate (MFR) of 1.9 g/10 min.

In a second run, the pressure and temperature conditions were maintained unchanged, and ethylene was supplied to the reactor in the same amount as before. The only difference was that about 50 l of 1,9-decadiene/h was added to the first stage of the reactor. To obtain a polymer material having a melt flow rate (MFR) of 1.9, as in the first run, the same amount of methyl ethyl ketone (MEK) as in the first run had to be added in the second run. The resulting copolymer had a degree of unsaturation of 0.35 double bonds/1000 C.

The fact that the same amount of the conventional chain-transfer agent (MEK) is required in both runs indicates that 1,9-decadiene does not act as a chain-transfer agent.

EXAMPLE 16

In order to show that the non-conjugated dienes according to the invention (here 1,9-decadiene) do not act as chain-transfer agents but as comonomers and that they form copolymers with ethylene, the following test was performed on the polymer of Example 15.

Samples of the polymer were fractionated in different molecular-weight fractions, and the number of vinyl double bonds per 1000 carbon atoms was determined for the different fractions. The employed fractionation method is described in detail by W. Holtrup in "Zur Fraktionierung von Polymeren durch Direktextraktion", Macromol. Chem. 178 (1977), pp 2335–2349, and was performed as follows.

Prior to fractionation, the sample (5 g) was dissolved in 400 ml of xylene having a temperature of about 120° C., and was precipitated after cooling in 800 ml of acetone. The solution was filtered, and the polymer was dried at room temperature.

In fractionation, use was made of an apparatus which consisted of a double-walled glass vessel. The vessel was heated by oil circulating between the walls. The sample was mixed by an agitator, and the temperature of the solution was controlled by a thermometer.

The sample was fractionated in mixtures of two different solvents (xylene and oxitol). The solvents were heated to 114° C., whereupon the sample was poured and agitation began. After 15 min, the solution was removed from the vessel while the undissolved part of the sample had been collected in glass wool provided on the bottom of the vessel and covered by a metal netting. The dissolved part of the sample was precipated by acetone, filtered off, washed with acetone that had been stabilised by Irganox 1010, and dried. Then, the undissolved part of the sample was treated by a new preheated mixture of solvents of a different composition, and so forth, until the entire sample had dissolved. The results of fractionation and the used solvent mixtures of xylene (stabilised by 1 g of Irganox 1010 per litre) and oxitol, appear from Table 2 below.

TABLE 2

| Fraction No. | Xylene (ml) | Oxitol (ml) | Dissolved material (%) |
| --- | --- | --- | --- |
| 1 | 140 | 160 | 6.75 |
| 2 | 155 | 145 | 5.80 |
| 3 | 170 | 130 | 6.74 |
| 4 | 185 | 115 | 42.56 |
| 5 | 200 | 100 | 28.82 |
| 6 | 215 | 85 | 7.30 |
| 7 | 300 | 0 | 2.03 |

After fractionation of the polymer samples, the vinyl content of the fractions was determined with the aid of IR spectroscopy by measuring the absorbance at 910 cm$^{-1}$. The distribution (D) of molecular weight as well as the average molecular weight (Mn, Mw) of the different fractions were determined by means of high-temperature GPC with an on-line viscometer. The column used was 3x Toyosoda mixed bed, the solvent was trichlorobenzene, and the temperature was 135° C. The results appear from Table 3 below.

TABLE 3

| Fraction No. | Mn | Mw | D | Vinyl unsaturation per 1000° C. |
| --- | --- | --- | --- | --- |
| 1 | 3900 | 7810 | 2,0 | 0,29 |
| 2 | 5990 | 15600 | 2,6 | 0,26 |
| 3 | 10200 | 39000 | 3,3 | 0,24 |
| 4 | 20100 | 72600 | 3,6 | 0,28 |
| 5 | 76300 | 481000 | 6,3 | 0,25 |
| 6 | 52200 | 422000 | 8,1 | 0,23 |
| The whole sample (bulk) | 17900 | 236000 | 13,2 | 0,29 |

As appears from Table 3, the vinyl unsaturation per 1000 C is essentially the same for the different fractions. If decadiene had acted as chain-transfer agent, the content would instead have been inversely proportional to the Mn of the fraction. This shows that the added diene (1,9-decadiene) had been polymerised in a substantially homogeneous and uniform fashion into the molecular chains of the polymer, i.e. 1,9-decadiene acts as a comonomer.

To conclude, this Example illustrates that the non-conjugated dienes having at least 8 carbon atoms in the chain according to the invention (here 1,9-decadiene) act as comonomers and not as chain-transfer agents in polymerisation with ethylene.

EXAMPLE 17 (COMPARATIVE)

A polymerisation test was performed with the same equipment and in a similar manner as in Example 8. Thus, about 30 kg of ethylene/h, but no diene to begin with, was pumped into the autoclave reactor. The pressure in the reactor was maintained at 125 MPa. The temperature in the upper zone was 180° C., while that in the lower zone was adjusted to 210° C. Thus, MFR was about 6 g/10 min. After obtaining stable operation conditions, pumping of 0.4 l of 7-methyl-1,6-octadiene/h into the reactor began. This addition corresponds to about 1% by weight of this diene in the gas mixture. As a result, MFR rose quickly to 120±20 g per 10 min without the addition of another chain-transfer agent. After about 2 h, the addition of diene was increased to 1.15 l/h. The resulting polymer was a viscous liquid at room temperature and had an MFR value above 1000 g/10 min. This Example shows that 7-methyl-1,6-octadiene is a strong chain-transfer agent and cannot be used as comonomer according to the invention.

EXAMPLE 18

One of the advantages of the invention is that the unsaturation introduced by the non-conjugated diene according to the invention makes the ethylene polymer more reactive in cross-linking. This means that less cross-linking catalyst (peroxide) is required to achieve a certain cross-linking when using the unsaturated polyethylene polymer according to the invention.

To illustrate this advantage, the following test was performed.

The following unsaturated polyethylene polymers were used.

| Polymer composition | Vinyl groups/1000° C. |
|---|---|
| A. Ethylene/1,9-decadiene | 0.7 |
| B. Ethylene/1,9-decadiene | 0.35 |
| C. Ethylene/1,9-decadiene | 0.25 |
| D. Ethylene/1,9-dekadiene/butyl-acrylate (Exemple 9) | 0.35 |
| E. Ethylene | 0.12 |

To each ethylene polymer was then added 0.2% by weight of Santonox (4,4'-thio-bis(2-tert-butyl-5-methyl phenol)) as stabiliser by compounding on a Buss kneader of the type PR46B-11D/H1.

The stabilised ethylene polymer was then divided into three batches, to each of which was added a cross-linking catalyst (dicumyl peroxide; "dicup") in varying concentrations ranging from 0.9% by weight to 2.1% by weight.

Pellets were made from the ethylene polymers, and plates were then made from the pellets by preheating at 120° C. for 2 min and compacting at 9.3 MPa for 2 min.

The resulting plates were then tested in a Göttfert elastograph measuring the changes of the shear modulus of cross-linkable polyethylene when the peroxide is decomposed and cross-links the polymer chains at 180° C. after 10 min. This testing method corresponds to ISO-6502.

The results appear from Table 4 below. It is evident from the Table that the peroxide content required to attain a certain degree of cross-linking, measured as a change of 0.67 Nm of the shear modulus, decreases as the unsaturation of the ethylene polymer increases.

TABLE 4

Göttfert elastograph at 180° C., 10 min. Stabilised base resins.

| Sample | Number of vinyl groups /1000° C. | Dicup-content [%] | Göttfert elastograph (max) [Nm] | Dicup content to attain 0.67 Nm [%] |
|---|---|---|---|---|
| A + 0.2% Sx | 0.7 | 0.9 | 0.40 | |
| A + 0.2% Sx | 0.7 | 1.1 | 0.54 | 1.3 |
| A + 0.2% Sx | 0.7 | 1.7 | 0.77 | |
| B + 0.2% Sx | 0.35 | 1.1 | 0.44 | |
| B + 0.2% Sx | 0.35 | 1.4 | 0.58 | 1.6 |
| B + 0.2% Sx | 0.35 | 1.7 | 0.73 | |
| C + 0.2% Sx | 0.25 | 1.4 | 0.51 | |
| C + 0.2% Sx | 0.25 | 1.7 | 0.63 | 1.8 |
| C + 0.2% Sx | 0.25 | 2.1 | 0.80 | |
| D + 0.2% Sx | 0.35 | 1.1 | 0.45 | |
| D + 0.2% Sx | 0.35 | 1.4 | 0.59 | 1.6 |
| D + 0.2% Sx | 0.35 | 1.7 | 0.72 | |
| E + 0.2% Sx | 0.12 | 1.4 | 0.44 | |
| E + 0.2% Sx | 0.12 | 1.7 | 0.56 | 2.0 |
| E + 0.2% Sx | 0.12 | 2.1 | 0.71 | |

Cross-linking was also checked by measuring the thermal deformation at 200° C. and a load of 20 N/cm$^2$. This method corresponds to IEC-811-2-1-9 (hot set method). IEC-811 prescribes measurements on sample bars from cable insulation having a thickness of 0.8–2.0 mm, but in this case measuring was performed on sample bars punched out of cross-linked plates by the punch DIN 53504-S2. Three sample bars per material were punched out of the plates. The bars were suspended in a Heraeus oven, and their elongation was determined after 15 min at 200° C. The maximum permissible elongation for peroxide-cross-linkable polyethylene is 175% according to IEC-811. The results appear from Table 5 below, from which it is evident that the peroxide content can be reduced and controlled by the choice of the content of vinyl groups, i.e. the unsaturation of the polymer. It is further apparent that the elongation values (hot set) according to the Table are improved proportionally more than the shear modulus according to Table 4 for the same addition of peroxide. This effect is surprising, and means that the peroxide addition can be further reduced in the context of cables, when polymers of a high degree of unsaturation are used. The most important value in the quality control of cables is the elongation value, whereas the change of shear modulus may be of more importance in other applications.

TABLE 5

Elongation measured according to IEC-811. Requirement: maximum elongation of 175% at 200° C., 20 N/cm², after 15 min.

| Base resins | Number of vinyl groups/ 1000° C. | Dicup content [%] | Elongation [%] | Comment |
|---|---|---|---|---|
| A + 0.2% Sx | 0.7 | 0.9 | 267 | |
| A + 0.2% Sx | 0.7 | 1.1 | 92 | |
| A + 0.2% Sx | 0.7 | 1.4 | 55 | |
| B + 0.2% Sx | 0.35 | 1.1 | 265 | 1 bar broke |
| B + 0.2% Sx | 0.35 | 1.4 | 100 | |
| B + 0.2% Sx | 0.35 | 1.7 | 62 | |
| C + 0.2% Sx | 0.25 | 1.4 | 180 | 1 bar broke |
| C + 0.2% Sx | 0.25 | 1.7 | 88 | |
| C + 0.2% Sx | 0.25 | 2.1 | 52 | |
| D + 0.2% Sx | 0.35 | 1.1 | 170 | 1 bar broke |
| D + 0.2% Sx | 0.35 | 1.4 | 73 | |
| D + 0.2% Sx | 0.35 | 1.7 | 45 | |
| E + 0.2% Sx | 0.12 | 1.4 | — | 3 bars broke |
| E + 0.2% Sx | 0.12 | 1.7 | 215 | |
| E + 0.2% Sx | 0.12 | 2.1 | 92 | |

EXAMPLE 19

To the different polymer resins of the foregoing Example which had been stabilised by 0.2% by weight of Santonox by compounding on a Buss kneader of PR46B-11D/H1-type was added peroxide in an amount required to achieve one and the same cross-linking measured by the Göttfert elastograph (cf. Table 4). Then, 20 kV cables were made from these different cross-linkable polymers on a pilot cable line from Nokia-Maillefer at three different line velocities: 1.6 m/min, 1.8 m/min and 2.0 m/min.

These cables had a metallic conductor in the form of seven wires having a total cross-section of 50 mm² and a common diameter of 8.05 mm. This conductor was surrounded by an inner semiconductor layer having a thickness of 0.5 mm, an insulating layer consisting of the diene copolymer at issue and having a thickness of 5.5 mm, and finally a semiconductor layer having a thickness of 1.4 mm. Thus, the total cable diameter was 22.8 mm. The inner semiconductor layer consisted of a thermoplastic LDPE containing 39% of carbon black, while the outer semiconductor was EVA-based and contained 0.5% of peroxide. It should here be mentioned that the strippability of the outer semiconductor was satisfactory, owing to the material of the insulating layer being a pure hydrocarbon polymer. If an ethylene/acrylate terpolymer according to WO91/07761 had instead been used, the polarities of the insulating and the semiconductor layers would have become too similar, and adhesion would thus have been too high.

A 60 mm/24D extruder was used for the insulating material of the cables. The extruder temperature was set at 110° C., 115° C., 120° C., 120° C., 125° C., 125° C. and 125° C. Nitrogen gas at a pressure of 1 MPa was used in the vulcanising tube, which had a length of 26 m. In this tube, a first zone of 3.7 m was maintained heat-neutral, a second zone of 3 m was maintained at 400° C., a third zone of 3 m was maintained at 370° C., and a fourth zone of 4.3 m was maintained neutral, as the first zone. The tube ended by a 11.6-m cooling zone which was cooled by cold water at a temperature not exceeding 40° C. At the most, the cable temperature was 135° C. at the inlet of the vulcanising tube and 90° C. at the outlet of the tube.

Thereafter, the degree of cross-linking of the cable insulation was determined according to IEC-811 (hot set method). Three lengths of 10 cm were taken from the cable insulation closest to the inner semiconductor and at the same distance by means of a splitting machine. Then, three sample bars were punched out from these lengths by the punch DIN 53504-SA2. The thermal deformation at 200° C. and a load of 20 N/cm² was then measured on the sample bars after 15 min, in accordance with ICE-811. The results appear from Table 6 below, which clearly shows that the amount of peroxide can be reduced as a function of an increased amount of vinyl groups, i.e. an increased unsaturation of the ethylene polymer. Alternatively, the advantage of the increased rate of cross-linking may serve to give a higher production speed on the line, or a combination of both.

TABLE 6

Elongation measured according to IEC-811. Requirement: maximum elongation of 175% at 200° C., 20 N/cm², after 15 min.

| Base resins | Number of vinyl groups/ 1000° C. | Dicup content [%] | Line speed [m/min] | Elongation [%] |
|---|---|---|---|---|
| A + 0.2% Sx | 0.7 | 1.3 | 1.6 | 62 |
| A + 0.2% Sx | 0.7 | 1.3 | 1.8 | 70 |
| A + 0.2% Sx | 0.7 | 1.3 | 2.0 | 127 |
| B + 0.2% Sx | 0.35 | 1.6 | 1.6 | 93 |
| B + 0.2% Sx | 0.35 | 1.6 | 1.8 | 100 |
| B + 0.2% Sx | 0.35 | 1.6 | 2.0 | 153 |
| C + 0.2% Sx | 0.25 | 1.8 | 1.6 | 87 |
| C + 0.2% Sx | 0.25 | 1.8 | 1.8 | 98 |
| C + 0.2% Sx | 0.25 | 1.8 | 2.0 | 155 |
| D + 0.2% Sx | 0.35 | 1.6 | 1.6 | 70 |
| D + 0.2% Sx | 0.35 | 1.6 | 1.8 | 87 |
| D + 0.2% Sx | 0.35 | 1.6 | 2.0 | 148 |
| E + 0.2% Sx | 0.12 | 2.1 | 1.6 | 80 |
| E + 0.2% Sx | 0.12 | 2.1 | 1.8 | 105 |
| E + 0.2% Sx | 0.12 | 2.1 | 2.0 | 143 |

We claim:

1. A method of producing, by radical polymerization through a high pressure process, an unsaturated copolymer of ethylene and at least one monomer which is copolymerizable with ethylene; said method including a step of:
   (a) providing during the copolymerization at least one monomer which is copolymerizable with ethylene and, which is a polyunsaturated compound selected from the group consisting of 1,7-octadiene, 1,9-decadiene and 1,13-tetradecadiene.

2. The method of claim 1 wherein the polyunsaturated comonomer is 1,9-decadiene.

3. The method of claim 1 further comprising providing during the copolymerization a vinyl-unsaturated monomer which is copolymerisable with ethylene.

4. The method of claim 3 wherein the vinyl-unsaturated monomer includes a $C_3$–$C_8$ α-olefin.

5. The method of claim 3 wherein the vinyl-unsaturated monomer includes at least one functional group selected from the group consisting of a hydroxyl group, an alkoxy group, a carbonyl group, a carboxyl group and an ester group.

6. A tube comprising a copolymer produced by the method of claim 1.

7. A material for electric cables comprising a copolymer produced by the method of claim 1.

8. The material for electric cables of claim 7 wherein said material is an insulating layer material, a semiconductor-layer material or a sheath material.

9. The method of claim 1 wherein hydroxyl groups or carboxyl groups are introduced into the unsaturated copolymer by a reaction with compounds containing such groups.

10. A method of preparing an unsaturated copolymer of ethylene comprising:

radical copolymerizing a mixture including ethylene and a polyunsaturated comonomer under high pressure to produce a first copolymer;

wherein the polyunsaturated comonomer has an unsubstituted straight carbon chain of ten to fourteen carbon atoms which is free from any heteratom; the polyunsaturated comonomer including at least four carbon atoms between two, non-conjugated, double bonds; wherein at least one double bond is a terminal double bond.

11. The method of claim 10 comprising radical polymerizing a mixture including ethylene, the polyunsaturated comonomer, and a $C_3$–$C_8$ α-olefin.

12. The method of claim 10 comprising radical polymerizing a mixture including ethylene, the polyunsaturated comonomer, and a vinyl-unsaturated monomer which includes a hydroxyl group, an alkoxyl group, a carbonyl group, a carboxyl group or an ester group.

13. The method of claim 12 wherein the vinyl-unsaturated monomer includes (meth)acrylic acid, an alkyl (meth)acrylate or vinyl trimethoxy silane.

14. The method of claim 12 wherein the vinyl-unsaturated monomer includes butyl (meth)acrylate or vinyl acetate.

15. The method of claim 10 wherein the polyunsaturated comonomer is an α,ω-alkadiene.

16. The method of claim 15 wherein the α,ω-alkadiene includes 1,9-decadiene or 1,13-tetradecadiene.

17. The method of claim 10 comprising radical polymerizing the mixture including ethylene and the polyunsaturated comonomer at a pressure of about 100–300 MPa.

18. The method of claim 10 comprising radical polymerizing the mixture including ethylene and the polyunsaturated comonomer at a temperature of about 80°–300° C.

* * * * *

UNITED STATES PATENT AND TRADEMARK OFFICE
CERTIFICATE OF CORRECTION

PATENT NO. : 5,539,075

DATED : July 23, 1996

INVENTOR(S) : Gustafsson et al.

It is certified that error appears in the above-identified patent and that said Letters Patent is hereby corrected as shown below:

On the title page, item:

[30], Foreign Application Priority Data "9103077" should read --9103077-5--

Col. 8, line 23 "1000 C" should read --1000°C--; line 41 "1000 C" should read --1000°C--; lines 44-45 "1000 C" should read --1000°C--

Col. 9, line 3 "1000 C" should read --1000°C--; lines 7-8 "1000 C" should read --1000°C--; line 20 "1000 C" should read --1000°C--; line 27 "1000 C" should read --1000°C--; line 34 "MRF" should read --MFR--

Col. 10, lines 65-66 "1000 C" should read --1000°C--

Col. 11, line 52, "dekadiene" should read --decadiene--; line 53, "(Exemple 9) should read --(Example 9)--

UNITED STATES PATENT AND TRADEMARK OFFICE
CERTIFICATE OF CORRECTION

PATENT NO. : 5,539,075

DATED : July 23, 1996

INVENTOR(S) : Gustafsson et al.

It is certified that error appears in the above-identified patent and that said Letters Patent is hereby corrected as shown below:

Col. 14, line 50 "copolymerisable" should read --copolymerizable--

Signed and Sealed this

Fifteenth Day of July, 1997

Attest:

BRUCE LEHMAN

Attesting Officer

Commissioner of Patents and Trademarks